(12) United States Patent
Chou

(10) Patent No.: US 6,695,996 B2
(45) Date of Patent: Feb. 24, 2004

(54) METHOD AND APPARATUS FOR ADJUSTING DIE STROKE

(76) Inventor: Cheng-Ming Chou, 10/F-3, No. 8, Lane 226, Jen-ai Rd., Lin 16, Nanshin Vill., Linkou Hsiang, Taipei Hsien (TW)

( * ) Notice: Subject to any disclaimer, the term of this patent is extended or adjusted under 35 U.S.C. 154(b) by 273 days.

(21) Appl. No.: 10/020,237

(22) Filed: Dec. 18, 2001

(65) Prior Publication Data

US 2002/0180081 A1 Dec. 5, 2002

(30) Foreign Application Priority Data

Jun. 1, 2001 (TW) ........................................ 90113403 A

(51) Int. Cl.[7] ........................... B29C 43/58; B29C 45/80
(52) U.S. Cl. .................. 264/40.5; 264/320; 264/328.7; 425/150; 425/589; 425/450.1
(58) Field of Search ................................ 264/40.5, 319, 264/320, 328.1, 328.7; 425/150, 589, 450.1

(56) References Cited

U.S. PATENT DOCUMENTS

| | | | | |
|---|---|---|---|---|
| 4,531,901 A | * | 7/1985 | Andersen | .................... 425/150 |
| 4,828,474 A | * | 5/1989 | Ballantyne | .................... 425/150 |
| 4,900,242 A | * | 2/1990 | Maus et al. | ............... 264/328.7 |
| 5,306,564 A | * | 4/1994 | Guzikowski | ............. 425/450.1 |
| 5,869,109 A | * | 2/1999 | Guzikowski | ............. 425/451.9 |
| 5,922,266 A | * | 7/1999 | Grove | ..................... 264/328.7 |

* cited by examiner

Primary Examiner—Jill L. Heitbrink
(74) Attorney, Agent, or Firm—Rosenberg, Klein & Lee

(57) ABSTRACT

An apparatus for adjusting die stroke includes a plurality of adjustable helical springs, each of which is equipped with a displacement sensor, a rotation sleeve, and a rotation sleeve driver; a plurality of supporting rods; and a central processing unit. The apparatus is mounted between an oil-pressure cylinder and a top die movable above a bottom die. After the top and the bottom dies are closed to each other, deformation of the adjustable helical springs detected by the displacement sensors and errors measured at different points of molded product released from the dies are sent to the central processing unit for operation. Based on operation results, the central processing unit sends adjusting signals to the rotation sleeve drivers for the same to turn the rotation sleeves and thereby adjusts the helical springs to required modulus of elasticity for use in next cycle of molding process to reduce product errors.

19 Claims, 11 Drawing Sheets

METHOD AND APPARATUS FOR ADJUSTING DIE STROKE

FIELD OF THE INVENTION

The present invention relates to method and apparatus for adjusting die stroke, and more particularly to die stroke adjusting method and apparatus in which adjustable helical springs equipped with displacement sensors and rotation sleeve drivers are employed to accurately adjust a die stroke under control of a central processing unit.

BACKGROUND OF THE INVENTION

In a conventional molding technology, molten material is poured from a melting furnace into a cavity of a bottom die and a downward force is applied on a top die against the bottom die, so that a molded product is formed. In the process of molding, there are many factors, including the arrangement of dies, the pouring of molding material, the control of mold temperature, the control of die stroke and travel time, the process of conservative pressure, etc., that have influences on the final shape, the surface smoothness, and the wall thickness of the molded product. In other words, an accumulative error could result from overall parameters in the process of molding. However, such change in the accuracy of products is usually detected only when a considerable quantity of inferior products have been produced. At this point, the production has to be interrupted to examine the production equipment, to replace dies and/or accessories, etc. A lot of time and efforts would be required to do so and it is possible that the problem is not found or overcome.

Moreover, in the conventional variable-volume mold-filling process, there might be more than one size for the same type of product to provide consumers with more choices. To reduce the times of replacing dies or to reduce the replacement of stroke control apparatus in order to increase the yield, it is a common practice to use a variable-volume mold cavity in a part of or the whole space of the same one mold cavity in order to change the specifications of products. When an amount of plastic material is injected into a variable-volume mold cavity, any difference in the injection pressure and any displacement of the movable die would have influences on the specifications and surface smoothness of the resultant products. It is therefore necessary to precisely control any change of the pressure of the molten plastic material in the variable-volume mold cavity against each point on the movable die and any resultant displacement of the movable die in order to meet the required high accuracy of the products.

In brief, the conventional molding skill and the conventional variable-volume mold-filling skill all need improvements to overcome the above-mentioned problems and to produce perfect products.

SUMMARY OF THE INVENTION

A primary object of the present invention is to provide an apparatus for adjusting die stroke so as to reduce errors of a molded product.

Another object of the present invention is to provide a method for adjusting die stroke so as to replace the conventional empirical method in determining problems in a molding process, and to effectively reduce the rate of bad yield of molded products and accordingly the manufacturing cost thereof.

To achieve the above and other objects, the apparatus for adjusting die stroke of the present invention mainly includes a plurality of adjustable helical springs, each of which is equipped with a displacement sensor, a rotation sleeve, and a rotation sleeve driver, a plurality of supporting rods, and a central processing unit. The displacement sensors send signals of magnitude of deformation of the adjustable helical springs to the central processing unit for comparing with errors measured at different points of a molded product released from the dies. Based on the comparison results, the central processing unit sends adjusting signals to the rotation sleeve drivers for the same to turn the rotation sleeves and thereby adjusts the helical springs to a required modulus of elasticity for use in a next cycle of molding process.

It is known that when the adjustable helical spring is under a load, an increased modulus of elasticity allows the spring to have a reduced magnitude of deformation, and a reduced modulus of elasticity allows the spring to have an increased magnitude of deformation. When this principle is applied to the molding process having a constant force applied by an oil-pressure cylinder on the molding dies, the adjustable helical springs of the apparatus of the present invention could be adjusted from time to time to reduce errors in an entire stroke of the top die. And when the same principle is applied to the variable-volume mold-filling process having a constant injection pressure in subsequent injection process, the adjustable helical springs of the apparatus of the present invention could be adjusted from time to time to adjust the displacement of the entire movable die.

The apparatus for adjusting die stroke is mounted between an oil-pressure cylinder and a top die movable above a bottom die in the case of a molding process, and between a plate of top die and a movable die in the case of a variable-volume mold-filling process. The apparatus includes an upper stroke limiting plate, a lower stroke limiting plate, a plurality of supporting rods, a plurality of adjustable helical springs, and a central processing unit.

The upper stroke limiting plate is associated with a pressing plate of the oil-pressure cylinder in the case of molding process, or with the plate of top die in the case of variable-volume mold-filling process, and is provided at a bottom surface with a plurality of adjustable spring seats and a plurality of adjustable supporting rod seats.

The lower stroke limiting plate is associated with a pressing plate of the top die in the case of molding process, or with the movable die in the case of variable-volume mold-filling process, and is provided at a top surface with a plurality of fixed spring seat and a plurality of fixed supporting rod seats corresponding to the adjustable spring seats and the adjustable supporting rod seats, respectively.

Each of the supporting rods is mounted between a pair of adjustable supporting rod seat and fixed supporting rod seat for adjusting an initial distance between the upper and the lower stroke limiting plates and for supporting an initial load set for the apparatus. The purpose of setting the initial load is to effectively reduce errors in a whole stroke of the top die at a final stage of the molding process, and to overcome a total mold-filling pressure at a first stage of the variable-volume mold-filling process in order to keep the movable die from undesired displacement.

Each of the adjustable helical springs is mounted between a pair of adjustable spring seat and fixed spring seat, and includes a male case, a female case, a rotation sleeve rotatably mounted between the male and the female cases, and a helical spring enclosed in and axially extended between the male and the female cases. A displacement sensor is connected to each adjustable helical spring for detecting a change in length of the helical spring and sending a signal of the detected result to the central processing unit. The rotation sleeve is associated with a rotation sleeve driver that receives an adjusting signal output by the central processing unit to drive the rotation sleeve in order to obtain a required modulus of elasticity for the helical spring. When the helical springs are subject to the initial force and deform, their screw pitches change, too. By selecting male cases and rotation sleeves having proper screw pitches that are the same as that of the helical springs under the initial force, and adjusting the adjustable spring seats and the supporting rods on the apparatus to adjust the lengths of the adjustable helical springs, the helical springs maybe adjusted to a required initial force. By adjusting the supporting rods and the adjustable supporting rod seats, an overall height of the apparatus could be adjusted. And, by adjusting the adjustable spring seats, the initial force of the adjustable helical springs could be separately adjusted.

The central processing unit sets a load and a magnitude of deformation for each adjustable helical spring based on a total applied force in the molding process and the variable-volume mold-filling process and positions of the adjustable helical springs relative to the molding dies, and receives from the displacement sensors an actual magnitude of deformation of the adjustable helical springs under a load and obtains errors of a molded product, so as to modify the preset load and magnitude of deformation for each adjustable helical spring. The central processing unit also compares the modified settings of load and magnitude of deformation of the adjustable helical springs with basic parameters set for the adjustable helical springs and outputs adjusting signals to respective rotation sleeve drivers, so that each adjustable helical spring could have the required modulus of elasticity for use in a next cycle of the molding process and the variable-volume mold-filling process.

Since the apparatus for adjusting die stroke may have several adjustable helical springs having identical or different specifications and there is an error in each helical spring, even helical springs having the same specifications do not necessarily have the same modulus of elasticity, and the rotation sleeves do not engage with coils of the helical springs at the same positions. For helical springs having the same load to have different magnitudes of deformation, or for helical springs having different loads to have the same magnitude of deformation, the central processing unit has to store basic parameters for each adjustable helical spring before the apparatus for adjusting die stroke is started to operate.

These basic parameters for each adjustable helical spring include an angle by which the rotation sleeve driver rotates, a load of the helical spring, and a magnitude of deformation of the helical spring. For the central processing unit to conduct operations and modification of settings when the apparatus operates, the basic parameters form a parameter table of three-dimensional matrix. When the rotation sleeve of each adjustable helical spring is driven to rotate an angle, the modulus of elasticity of the adjustable helical spring is changed. Thus, several fixed applied forces used to cause corresponding deformation of a helical spring constitute a parameter table of two-dimensional matrix for the modulus of elasticity. Or, a fixed applied force and several rotating angles of the rotation sleeves used to cause corresponding deformation of several helical springs constitute a parameter table of two-dimensional matrix for the applied force. The applied force could be obtained from a tension/pressure machine, and the magnitude of deformation could be obtained from the displacement sensors associated with the adjustable helical springs. Since the basic parameters of the adjustable helical springs only define a limited rotating angle for the rotation sleeve driver, a calculated modulus of elasticity from the central processing unit in an actual operation of the apparatus might not be included in the basic parameters. However, the central processing unit may also obtain a rotating angle for the rotation sleeve driver based on the existing basic parameters through an interpolation.

Since screw pitches of the rotation sleeve and the male case of each adjustable helical spring are the same as that of the helical spring are subject to the initial force, the rotation sleeve driver could function only when the apparatus for adjusting die stroke is not under any load. That is, in the molding process or the variable-volume mold-filling process, the rotation sleeve drivers could be actuated to adjust the adjustable helical springs only when the mold product has been released from the molding dies.

The present invention provides a cyclic adjusting mode in an attempt to form the best products with molding dies within a lowest possible number of process cycles through the convergence method. If the central processing unit could automatically read the errors of the molded product to adjust any accumulative error occurred in the molding process and the variable-volume mold-filling process from time to time, the rate of bad yield of the molded products could be minimized to largely facilitate the control and improvement of a molding process.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
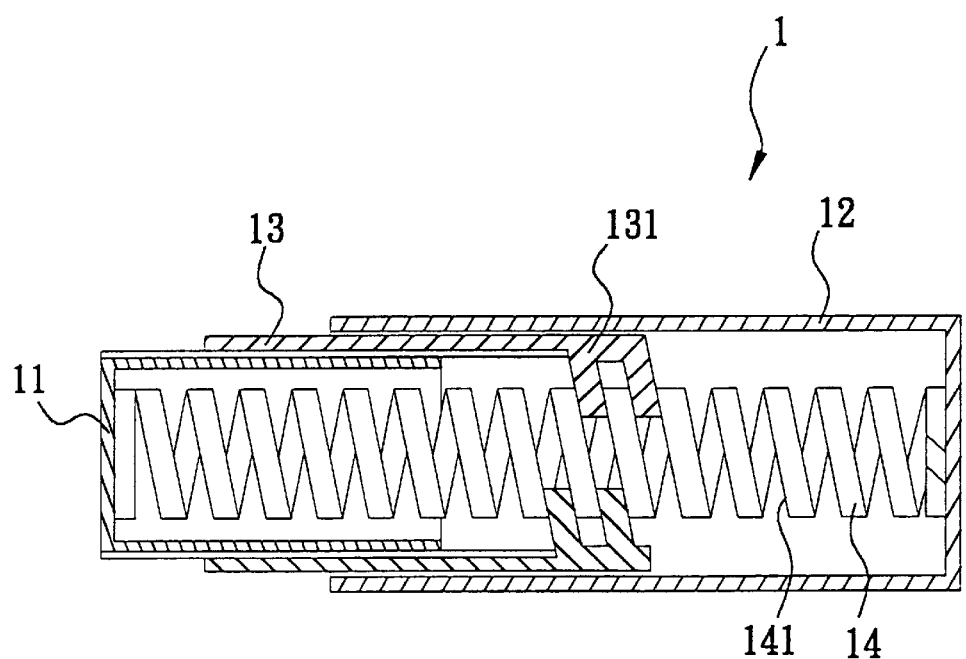
FIG. 1 is a sectional view of an adjustable helical spring employed in an apparatus for adjusting die stroke according to the present invention.

Please refer to FIG. 1 that shows an adjustable helical spring 1. The adjustable helical spring 1 mainly includes a male case 11, a female case 12, a rotation sleeve 13, and a helical spring 14. The rotation sleeve 13 is provided in its bore at predetermined positions with a plurality of stoppers 131 to engage with some coils 141 of the helical spring 14 and thereby could be used to adjust a modulus of elasticity of the helical spring 14 by turning the rotation sleeve 13. The adjustable helical spring 1 is employed in the apparatus for adjusting die stroke according to the present invention and further equipped with a displacement sensor and a rotation sleeve driver to form a very important member in the present invention.

Figure 2A:
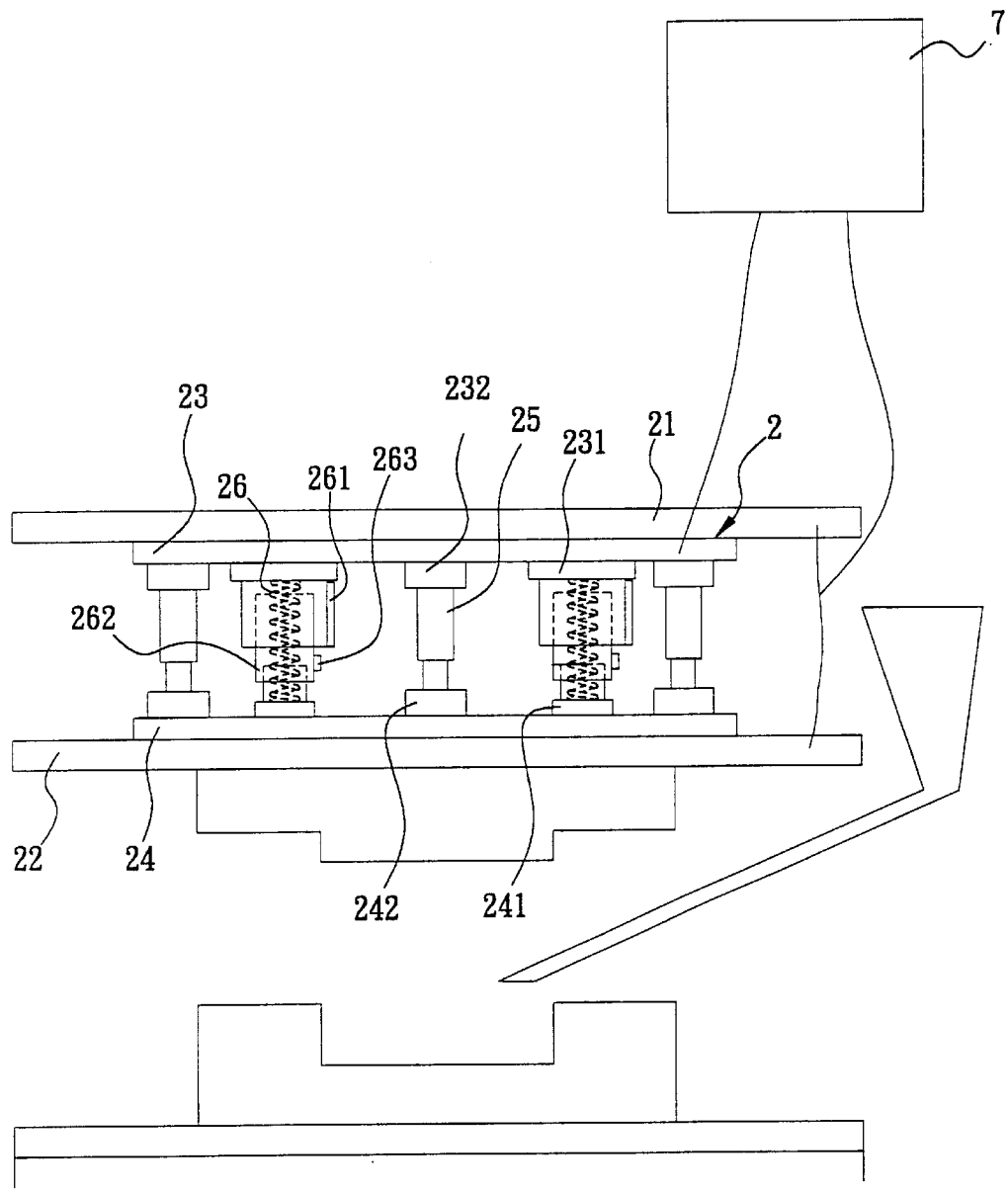
FIG. 2A is an elevational plan view showing the apparatus of the present invention used in a molding process.
Figure 2B:
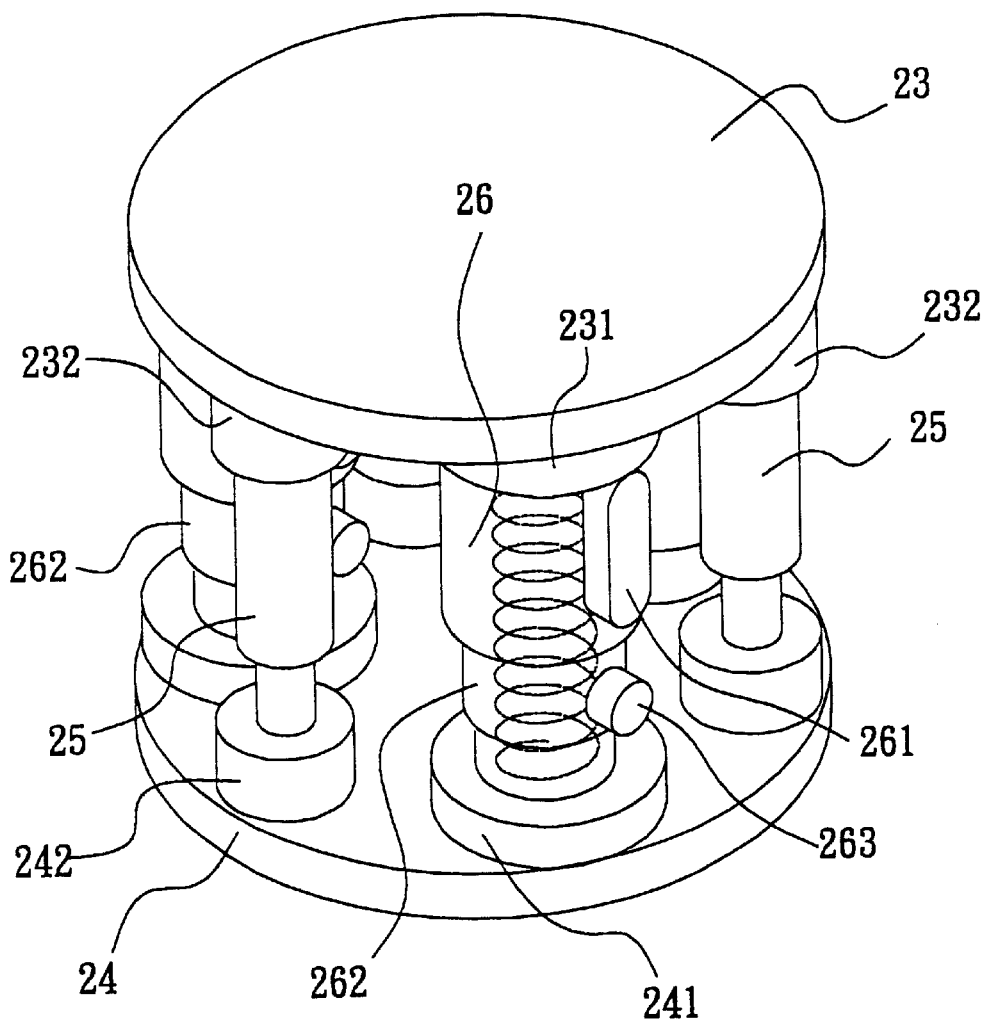
FIG. 2B is a perspective view of the apparatus of the present invention.

Please refer to FIG. 2A that is an elevational plan view of an apparatus 2 for adjusting die stroke according to the present invention used in a molding process, and to FIG. 2B that is a perspective view of the apparatus 2 of the present invention. For the purpose of simplicity, the apparatus 2 for adjusting die stroke of the present invention will be referred to as "the apparatus" 2 hereinafter. As shown, the apparatus 2 is mounted between a pressing plate 21 of an oil-pressure cylinder and a pressing plate 22 of a top die and mainly includes an upper stroke limiting plate 23, a lower stroke limiting plate 24, a plurality of supporting rods 25, a plurality of adjustable helical springs 26, and a central processing unit 7.

The upper stroke limiting plate 23 is associated with a bottom surface of the pressing plate 21 of the oil-pressure cylinder and is provided at a bottom surface thereof with a plurality of adjustable spring seats 231 and a plurality of adjustable supporting rod seats 232.

The lower stroke limiting plate 24 is associated with a top surface of the pressing plate 22 of the top die and is provided at a top surface thereof with a plurality of fixed spring seat 241 and a plurality of fixed supporting rod seats 242 corresponding to the adjustable spring seats 231 and the adjustable supporting rod seats 232, respectively.

Each of the supporting rods 25 is mounted between an adjustable supporting rod seat 232 and a corresponding fixed supporting rod seat 242. When the apparatus 2 is under a load to change an overall height thereof, the supporting rods 25 are not under any load. And, when the apparatus 2 is not under any load, the supporting rods 25 are under the initial force set for the apparatus 2. By maintaining an initial length of the supporting rods 25 and adjusting the adjustable supporting rod seats 232, the overall height of the apparatus 2 could be changed. The number and the arrangement of the supporting rods 25 are decided depending on actual need in the molding process.

Each of the adjustable helical springs 26 is mounted between an adjustable spring seat 231 and a corresponding fixed spring seat 241, and includes a male case, a female case, a rotation sleeve 262 and a helical spring, just as the adjustable helical spring 1. However, there is a displacement sensor 261 connected to each adjustable helical spring 26 for measuring a change in length of the helical spring 26 after the same is under a load and sending a signal representing a measured result to the central processing unit 7. The rotation sleeve 262 of the adjustable helical spring 26 has a rotation sleeve driver 263 connected thereto for receiving an adjusting signal output by the central processing unit 7 and driving the rotation sleeve 262 based on the received signal to obtain a required modulus of elasticity for the helical spring 26. The number and the arrangement of the adjustable helical springs 26 are decided depending on actual need in the molding process.

The central processing unit 7 sets load and magnitude of deformation for each adjustable helical spring 26 based on a total applied force in the molding process and relative positions of the adjustable helical springs 26 on the molding dies, and receives from the displacement sensors 261 signals representing the magnitude of deformation of the adjustable helical springs 26 under a load and obtains errors of a molded product in order to modify the preset load and magnitude of deformation for each adjustable helical spring 26 based on such signals and errors. The central processing unit 7 also compares the modified settings with basic parameters set for the adjustable helical springs 26 and outputs adjusting signals to respective rotation sleeve drivers 263, so that each adjustable helical spring 26 has the required modulus of elasticity for use in a next cycle of the molding process. That is, the present invention provides a cyclic adjusting mode in an attempt to form the best products with molding dies within a lowest possible number of process cycles through a convergence method. If the central processing unit is set to automatically read the errors of molded product to adjust any accumulative error occurred in the molding process from time to time, the rate of bad yield of the molded products could be minimized to largely facilitate the control and improvement of a molding process.

Figure 3:
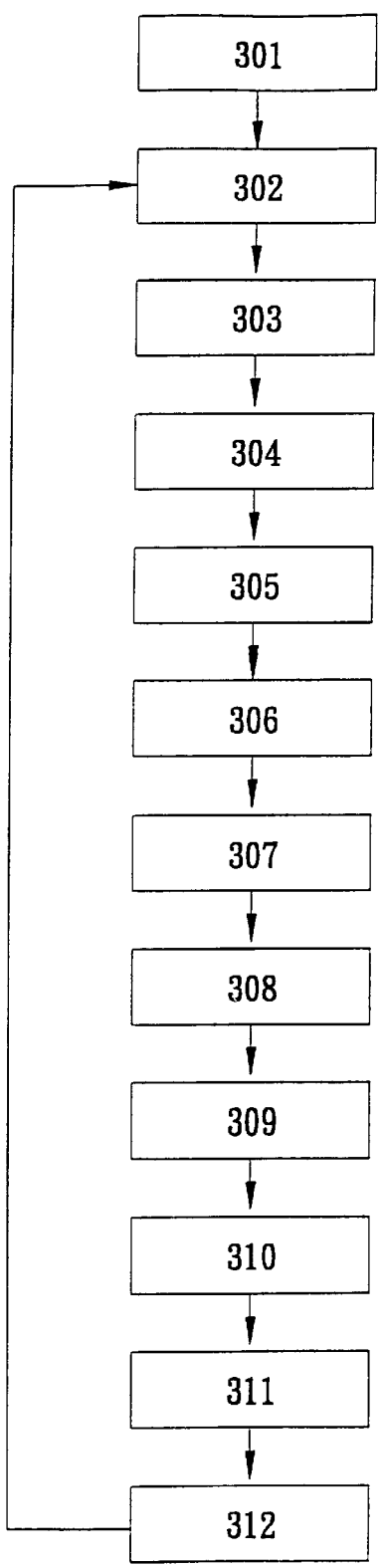
FIG. 3 is a flowchart showing steps of a method for adjusting a stroke of a top die according to the present invention applied to a molding process.

Please refer to FIG. 3 that is a flowchart showing steps included in the method of the present invention for adjusting the stroke of a top die in the molding process. The steps include:

1. Use the central processing unit 7 to store basic parameters for each adjustable helical spring 26 and to set (i) the initial force for the apparatus 2, (ii) an output force of the oil-pressure cylinder and a magnitude of deformation for each adjustable helical spring 26, and (iii) a load of each adjustable helical spring 26 based on the output force of the oil-pressure cylinder, the number of the adjustable helical springs 26, and the relative positions of the adjustable helical springs 26 on the molding die. The adjustable helical springs 26 may be initially set to have the same magnitude of deformation. (Step 301)
2. Calculate the modulus of elasticity of each adjustable helical spring 26 based on load and magnitude of deformation thereof, and employ the basic parameters to obtain through interpolation an angle by which the rotation sleeve 262 should be rotated, and use the rotation sleeve driver 263 to rotate the rotation sleeve 262 according to the obtained angle. (Step 302)
3. Set the top die to an initial position, so that a predetermined distance is kept between the top die and the bottom die to facilitate injection of molten material by an injection machine from one side of the top and the bottom dies. (Step 303)
4. Use the injection machine to inject a predetermined amount of molten material into the bottom die from one side of the top and the bottom dies. When the injection is completed, the injection machine is timely moved away from a moving path of the top die. (Step 304)
5. Actuate the oil-pressure cylinder to output a pressure, so that the pressing plate 21 of the oil-pressure cylinder, the upper stroke limiting plate 23, the adjustable helical springs 26, the lower stroke limiting plate 24, the pressing plate 22 of the top die, and the top die are simultaneously moved toward and onto the bottom die to apply the pressure on the molten material in the bottom die. (Step 305)

6. Use the pressure from the oil-pressure cylinder to force the molten material in the bottom die toward points having a lower pressure and to force any remained air out of the bottom die via vents provided on the molding dies, so that the molten material fills up a closed die cavity formed between the top and the bottom dies. (Step 306)

7. Let the dies gradually cool, so that the molten material in the closed die cavity and the air vents become hardened. At this point, the apparatus 2 applies a conservative pressure on the molding material in the die cavity and the hardened molding material in the die cavity produces a back pressure against the pressure output by the oil-pressure cylinder. (Step 307)

8. Keep the oil-pressure cylinder in an unmoved state and maintain the conservative pressure of the apparatus 2 until the molding material in the die cavity is completely hardened to form a molded 15 product, so that the molded product evenly shrinks during the process of hardening to provide an enhanced surface quality. (Step 308)

9. Use the displacement sensors 261 of the respective adjustable helical springs 26 to send signals representing the displacements of the adjustable helical spring 26 to the central processing unit 7. (Step 309)

10. Return the top die to its initial position and release the molded product from the die cavity to complete one cycle of the molding process. (Step 310)

11. Use the central processing unit 7 to convert the displacement signals received from the displacement sensors 261 and to obtain errors of the released product at positions corresponding to the adjustable helical springs 26, and then calculate errors of loads of individual adjustable helical springs 26 to modify the magnitude of deformation and load previously set for each adjustable helical spring 26. (Step 311).

12. Return to step 302 and use the modified magnitude of deformation and load in the next cycle of molding process. (Step 312)

Figure 4:
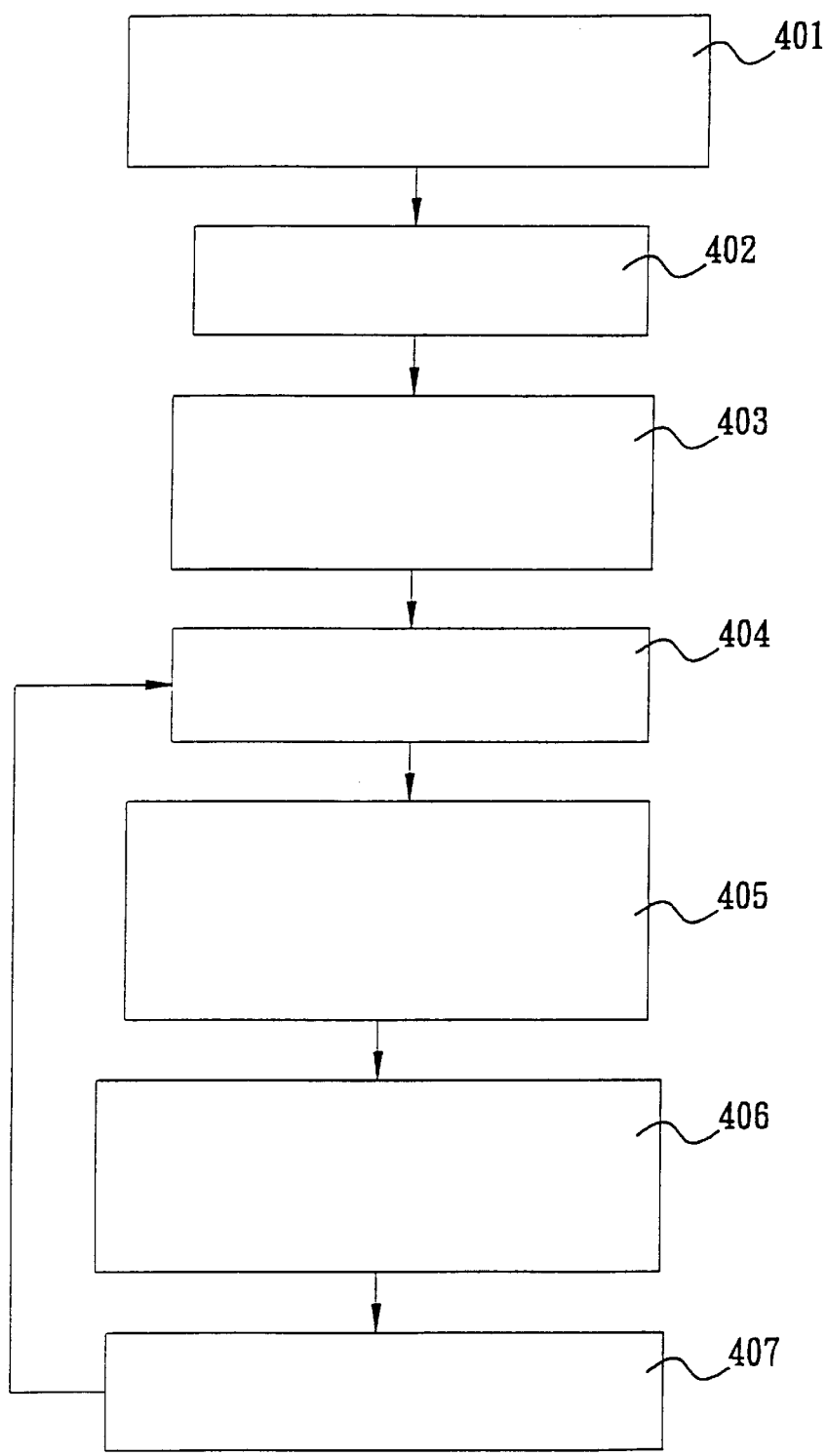
FIG. 4 is a flowchart showing steps of operation of a central processing unit included in the apparatus of the present invention.

Please refer to FIG. 4 that is a flowchart showing steps included in an operation of the central processing unit 7. The central processing unit 7 functions to obtain values of error of the molded product at the completion of each one cycle of the molding process, and then adjust the modulus of elasticity for each individual adjustable helical spring 26 based on the obtained errors by driving the rotation sleeve drivers 263 to rotate the rotation sleeves 262, so that errors in the molded product could be modified in the next molding process. The detailed steps include:

1. Store the basic parameters for each individual adjustable helical spring 26 in the central processing unit 7, including the angle by which the rotation sleeve 262 should be rotated, the load of the helical spring 26, and the magnitude of deformation of the helical spring 26. (Step 401)

2. Obtain the output force of the oil-pressure cylinder in the molding process and set the magnitude of deformation for the adjustable helical springs 26. The adjustable helical springs 26 are initially set to the same magnitude of deformation. (Step 402)

3. Calculate the load of each adjustable helical spring 26 according to the relative position of the adjustable helical spring 26 on the apparatus 2. (Step 403)

4. Calculate the modulus of elasticity for each adjustable helical spring 26 based on its load and its magnitude of deformation. (Step 404)

5. Use the basic parameters of each adjustable helical spring 26 to calculate through the interpolation to obtain an angle by which the adjustable helical spring 26 should be rotated. (Step 405)

6. When a molded product is obtained, measure errors of the molded product at positions corresponding to the adjustable helical springs 26 and the actual magnitude of deformation of the adjustable helical springs 26. (Step 406)

7. Modify the magnitude of deformation and the load for each individual adjustable helical spring 26 and return to step 404. (Step 407)

Figure 5:
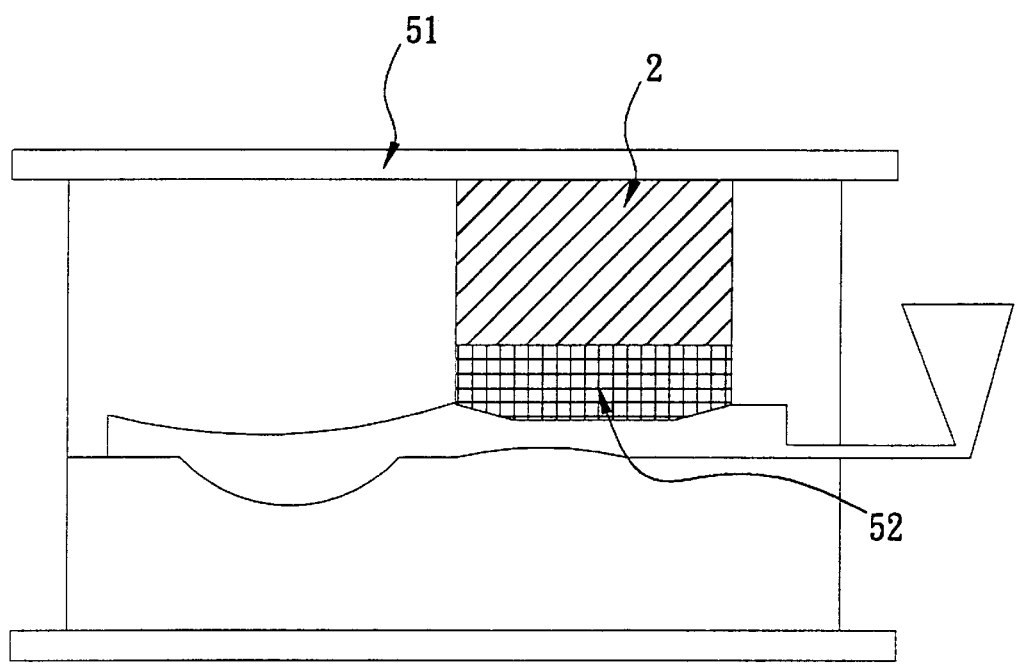
FIG. 5 is an elevational plan view showing the apparatus of the present invention used in a variable-volume mold-filling process.

Please refer to FIG. 5 that is an elevational plan view showing the apparatus 2 of the present invention used in a variable-volume mold-filling process. As can be seen from FIG. 5, the apparatus 2 is mounted between a plate of top die 51 and a movable die 52. The apparatus 2 used in this process has the same structure and functions in the same manner as that of the apparatus 2 used in the above-described molding process.

Figure 6:
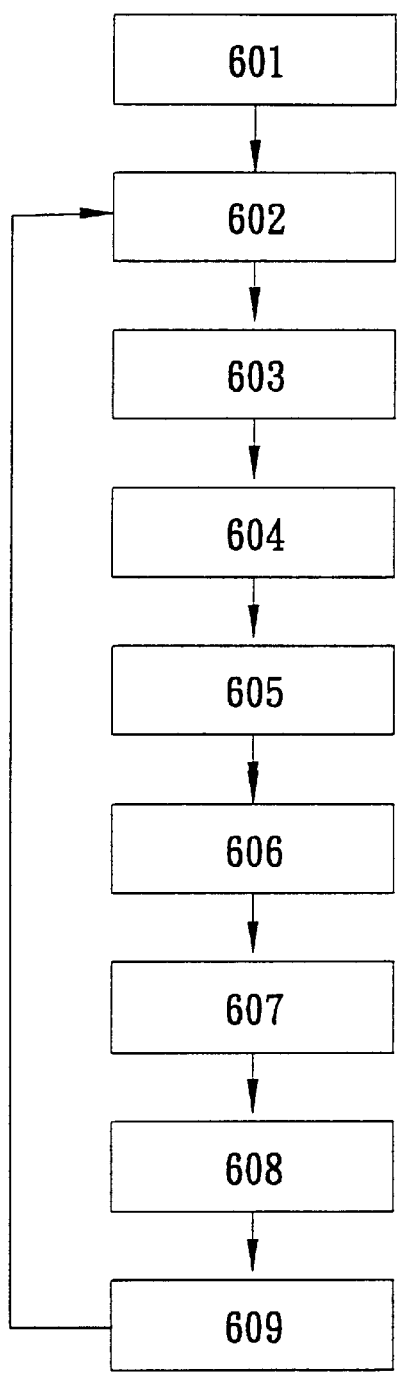
FIG. 6 is a flowchart showing steps of a method for adjusting a stroke of a movable die according to the present invention applied to a variable-volume mold-filling process.

Please refer to FIG. 6 that is a flowchart showing steps included in the die stroke adjusting method of the present invention applied to the variable-volume mold-filling process. The steps include:

1. Use the central processing unit 7 to store basic parameters for individual adjustable helical springs 26 and to set (i) the initial force for the apparatus 2, (ii) an initial injection pressure and a subsequent injection pressure, (iii) a magnitude of deformation for each adjustable helical spring 26, and (iv) loads for respective adjustable helical springs 26 based on the subsequent injection pressure, the number of the adjustable helical springs 26, and the positions of the adjustable helical springs 26 relative to the molding die. The adjustable helical springs 26 may be initially set to have the same magnitude of deformation. (Step 601)

2. Calculate the modulus of elasticity of each adjustable helical spring 26 based on load and magnitude of deformation thereof, and employ the basic parameters to obtain through the interpolation an angle by which the rotation sleeve 262 should be rotated, and use the rotation sleeve driver 263 to rotate the rotation sleeve 262 according to the obtained angle. (Step 602)

3. Move the plate of top die, the upper stroke limiting plate, the adjustable helical springs, the lower stroke limiting plate, and the top die toward the bottom die to perform mode-locked closing, open vents on the dies, and then inject a predetermined amount of molten material into the die cavity. The initial injection pressure will cause the molten material to fill up a fixed-volume portion of the die cavity. (Step 603)

4. Close the vents and actuate the subsequent injection pressure to fill up a variable-volume portion of the die cavity. Allow the movable die to stop at a point at where the load of the apparatus 2 and a pressure in the variable-volume die cavity reach a balance point. (Step 604)

5. Subject the molding material in the die cavity to the conservative pressure of the apparatus 2 until the molded product becomes completely hardened, so that the product evenly shrinks in the hardening process to provide an enhanced surface quality. (Step 605)

6. Send signals from the displacement sensors 261 of all adjustable helical springs 26 to the central processing unit 7. (Step 606)

Figure 7:
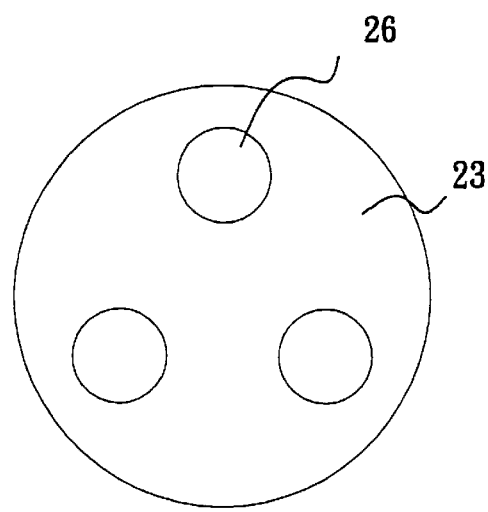
FIG. 7 shows the arrangement of three adjustable helical springs on a round upper stroke limiting plate.

7. Open the dies and release the molded product from the bottom die to complete one time of variable-volume mold-filling process. (Step 607)
8. Use the central processing unit 7 to convert the displacement signals received from the displacement sensors 261 and to obtain errors of the released product at positions corresponding to the adjustable helical springs 26, and then calculate errors of loads of individual adjustable helical springs 26 to modify the magnitude of deformation and load previously set for each adjustable helical spring 26. (Step 608).
9. Return to step 602 and use the modified magnitude of deformation and load in the next cycle of the mold-filling process. (Step 609) Please refer to FIG. 7 that shows three adjustable helical springs 26 of the apparatus 2 are arranged on an upper stroke limiting plate 23 that has a round shape. According to the principle that three points together define a plane and in consideration of a convenient calculation by the central processing unit 7, the three adjustable helical springs 26 on the round limiting plate 23 are preferably equally spaced by 120 degrees along a circumference of a concentric circle of the round limiting plate 23.

Figure 8:
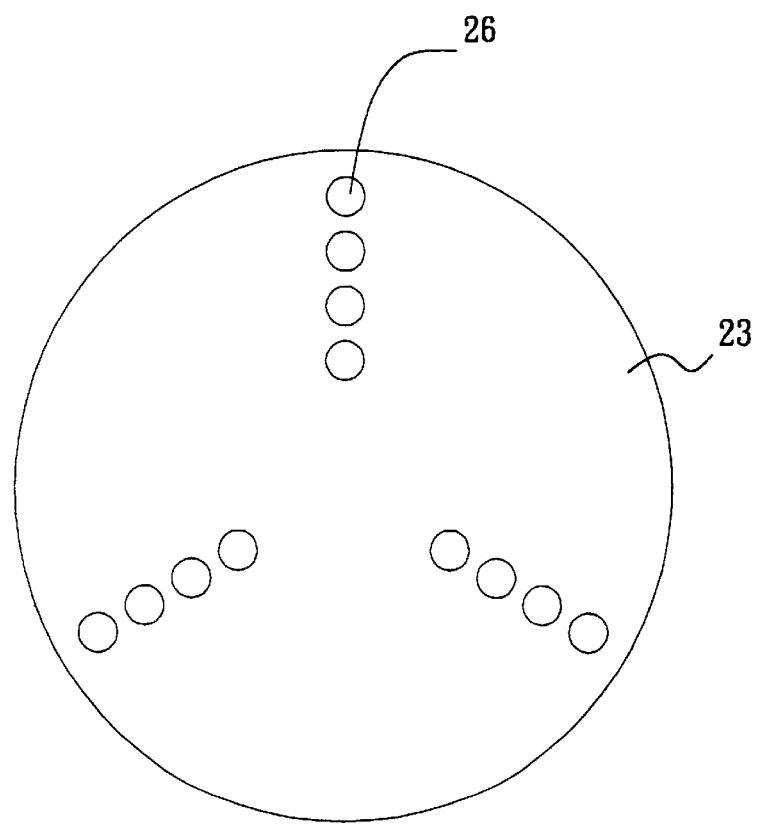
FIG. 8 shows the arrangement of twelve adjustable helical springs on a round upper stroke limiting plate.

FIG. 8 shows the apparatus 2 includes twelve adjustable helical springs 26 arranged on the upper stroke limiting plate 23 having a round shape and a large area. In this case, the adjustable helical springs 26 are divided into four groups of three helical springs. The helical springs 26 in each group are equally spaced by 120 degrees along a circumference of a concentric circle of the round limiting plate 23, such that there are total four concentric circles formed on the round limiting plate 23. Moreover, the twelve helical springs 26 are arranged into three radially extended rows, such that each row includes four adjustable helical springs 26.

Figure 9:
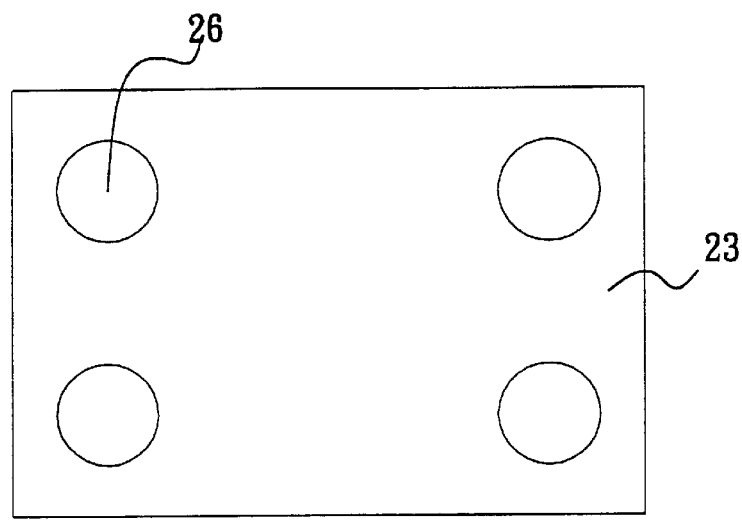
FIG. 9 shows the arrangement of four adjustable helical springs on a rectangular upper stroke limiting plate.

FIG. 9 shows the apparatus 2 includes four adjustable helical springs 26 arranged on the upper stroke limiting plate 23 having a rectangular shape. In consideration of a convenient calculation by the central processing unit 7, the four helical springs 26 are arranged on two diagonals of the rectangular upper stroke limiting plate 23 and located at four corners of a concentric rectangle of the upper stroke limiting plate 23.

Figure 10:
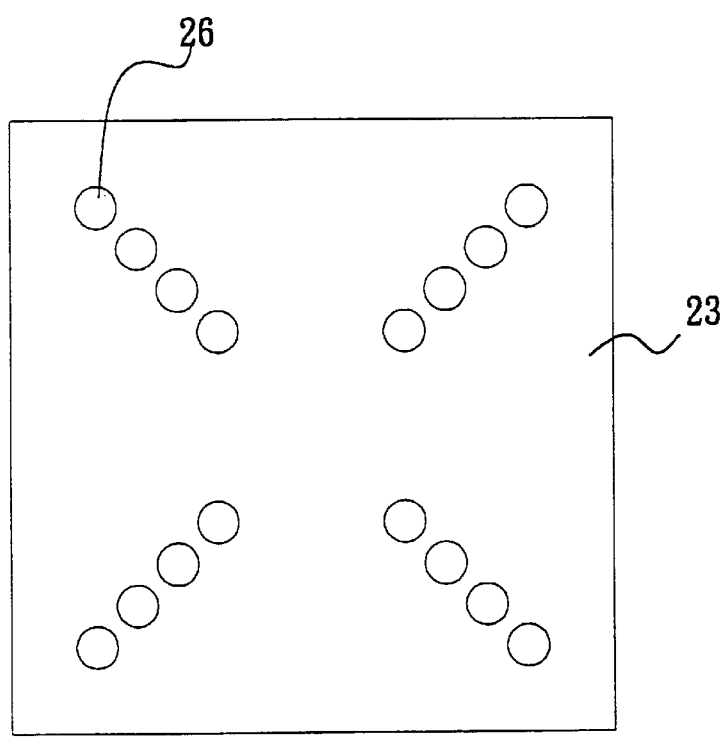
FIG. 10 shows the arrangement of twelve adjustable helical springs on a rectangular upper stroke limiting plate.

FIG. 10 shows the apparatus 2 includes sixteen adjustable helical springs 26 arranged on the upper stroke limiting plate 23 having a rectangular shape and a large area. In this case, the adjustable helical springs 26 are divided into four groups of four helical springs. The helical springs 26 are located on two diagonals of the rectangular upper stroke limiting plate 23 and divided into four groups of four helical springs 26, such that the helical springs 26 of each group are located at four corners of a concentric rectangle of the upper stroke limiting plate 23. Thus, there are total four concentric rectangles formed on the rectangular upper stroke limiting plate 23 and four radially extended rows of helical springs 26.

Figure 11:
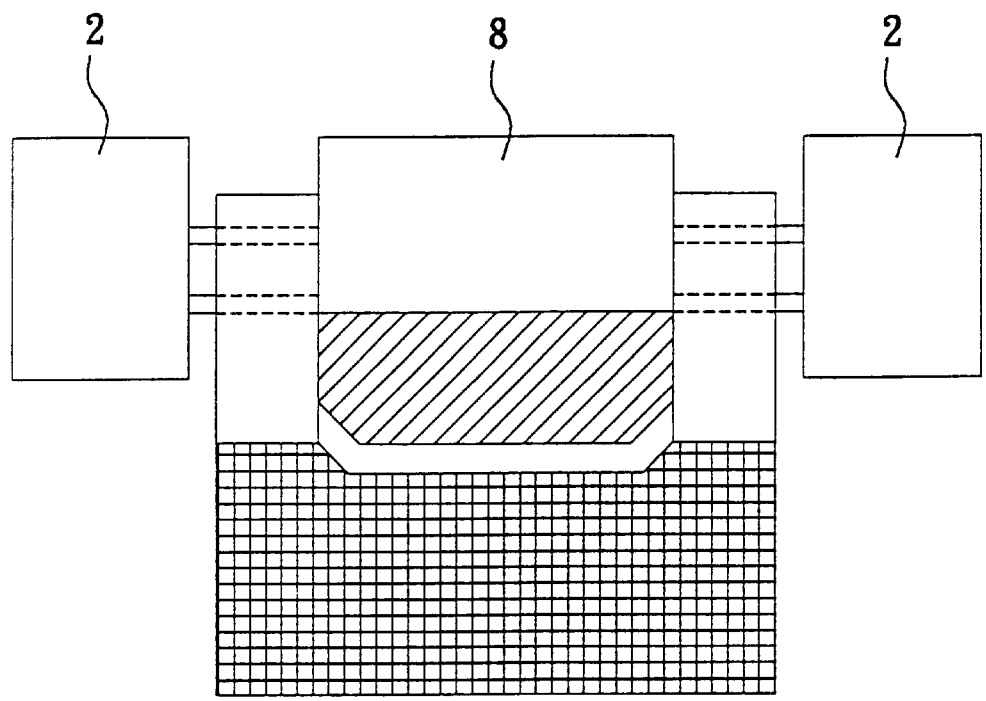
FIG. 11 is an elevational plan view showing the apparatus of the present invention connected to a lever mechanism.

FIG. 11 is an elevational plan view showing the apparatus 2 of the present invention is adapted to connect to a lever mechanism 8 to amplify a magnitude of deformation and thereby increase an accuracy of the apparatus 2. For this purpose, one or more apparatus 2 could be connected to a lever mechanism 8. Each of the apparatus 2 is set to the initial force. When the lever mechanism 8 is deformed under a pressure, the apparatus 2 are caused to deform due to a tension. Since the lever mechanism 8 has a magnitude of deformation that is smaller than that of the apparatus 2, the latter reflects an increased accuracy in the load and the produced deformation.

Figure 12:
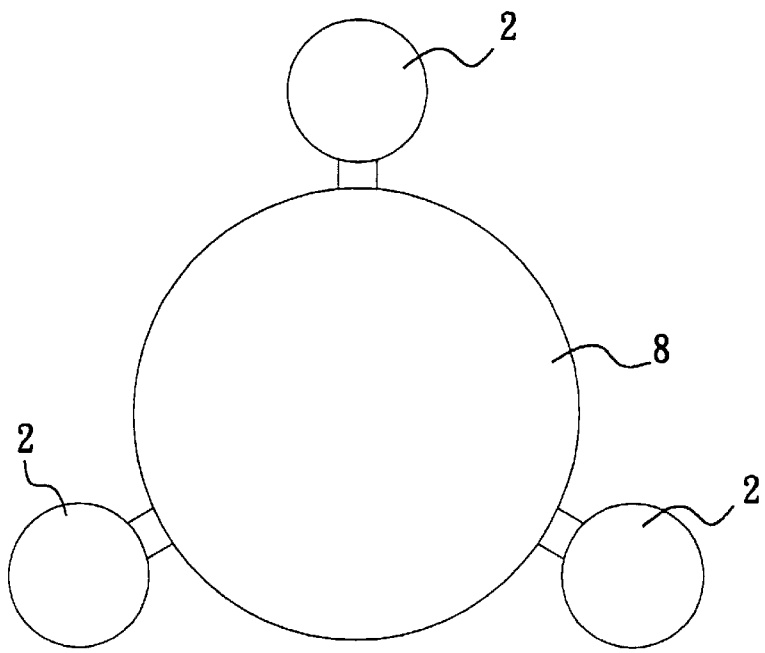
FIG. 12 shows the connection of the apparatus of the present invention to a lever mechanism for use with a round die.

Please refer to FIG. 12 that shows the connection of three apparatus 2 of the present invention to a lever mechanism 8 for use on a round die. In this case, the apparatus 2 are equally spaced by 120 degrees along an outer periphery of the lever mechanism 8 to obtain the best effect.

Figure 13:
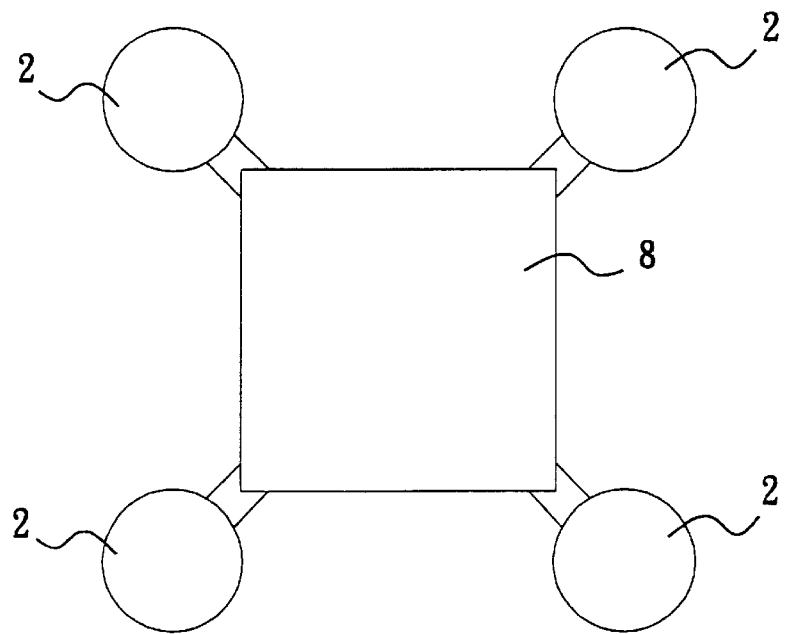
FIG. 13 shows the connection of the apparatus of the present invention to a lever mechanism for use with a rectangular die.

FIG. 13 shows the connection of four apparatus 2 of the present invention to a lever mechanism 8 for use on a rectangular die. In this case, the apparatus 2 are connected to four corners of the lever mechanism 8 to obtain the best effect.

The following are some advantages of the present invention over the prior art:

1. When the present invention is used in the molding process and the variable-volume mold-filling process, the central processing unit 7 is able to analyze data from the displacement sensors 261 on the adjustable helical springs 26 about the deformation of the helical springs 26 under a load as well as errors of the released product measured at positions corresponding to the adjustable helical springs 26, so that adjusting signals are sent from the central processing unit 7 to respective rotation sleeve drivers 263 for adjusting the modulus of elasticity of the adjustable helical springs 26. That is, with the present invention, it is possible to modify from time to time the error of the entire stroke of the molding die and any accumulative error thereof in the molding process, and to modify from time to time the displacement and any accumulative error of the entire movable die in the variable-volume mold-filling process.
2. The present invention could effectively replace the empirical method in determination of problems in a manufacturing process and therefore effectively reduces the rate of bad yield of molded products and the manufacture cost thereof.
3. The present invention could be applied to differently shaped molds or dies without causing any difference in its work efficiency.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A method for adjusting a stroke of a top die in a molding process, comprising the following steps:
    a. Preparing at least an apparatus for adjusting die stroke, each of said apparatus including, a plurality of supporting rods adjustably mounted between said upper and said lower stroke limiting plates, a plurality of adjustable helical springs mounted between said upper and said lower stroke limiting plates, and a central processing unit; each of said adjustable helical springs including a male case, a female case, a rotation sleeve rotatably mounted between said male and said female cases, a helical spring axially extended between said male and said female cases, a displacement sensor for measuring changes in length of said helical spring under a load and sending a signal to said central processing unit, and a rotation sleeve driver for driving said rotation sleeve to rotate an angle based on an adjusting signal from said central processing unit and thereby adjusting a modulus of elasticity of said helical spring;
    b. Using said central processing unit to store basic parameters for each said adjustable helical spring and setting (i) the initial force for said apparatus for adjusting die stroke, (ii) an output force of said oil-pressure cylinder and a magnitude of deformation for each said adjustable helical spring, and (iii) a load of each said adjustable helical spring based on said output force of said oil-pressure cylinder, a total number of said adjustable helical springs, and relative positions of said adjustable helical springs on said top die;

c. Calculating a modulus of elasticity of each said adjustable helical spring based on load and magnitude of deformation, and employing said basic parameters to obtain through an interpolation an angle by which each said rotation sleeve should be rotated, and using said rotation sleeve driver to rotate said rotation sleeve according to said obtained angle;

d. Setting said top die to an initial position, so that a predetermined distance is kept between said top die and a bottom die to facilitate injection of molten material by an injection machine from one side of said top and said bottom dies;

e. Using said injection machine to inject a predetermined amount of molten material into said bottom die from one side of said top and said bottom dies, and causing said injection machine to timely move away from a moving path of said top die when the injection is completed;

f. Actuating said oil-pressure cylinder to output a pressure, so that a pressing plate of said oil-pressure cylinder, said upper stroke limiting plate, said adjustable helical springs, said lower stroke limiting plate, a pressing plate of said top die, and said top die are simultaneously moved toward and onto said bottom die to apply the pressure on the molten material in said bottom die;

g. Using the pressure from said oil-pressure cylinder to force said molten material in said bottom die toward points having a lower pressure and to force any remained air out of said bottom die via vents provided on said molding dies, so that said molten material fills up a closed die cavity formed between said top and said bottom dies;

h. Letting said top and said bottom dies gradually cool, so that said molten material in said closed die cavity and said air vents become hardened, said apparatus applies a conservative pressure on said molding material in said die cavity, and said hardened molding material in said die cavity produces a back pressure against the pressure output by said oil-pressure cylinder;

i. Keeping said oil-pressure cylinder in an unmoved state and maintaining said conservative pressure of said apparatus until said molding material in said die cavity is completely hardened, so that a molded product formed from said hardened molding material evenly shrinks during the process of hardening to provide an enhanced surface quality;

j. Using said displacement sensors of said respective adjustable helical springs to send signals representing displacements of said adjustable helical springs to said central processing unit;

k. Returning said top die to its initial position and release said molded product from said die cavity to complete one cycle of said molding process.

l. Using said central processing unit to convert said displacement signals received from said displacement sensors and to obtain errors of said released molded product at positions corresponding to adjustable helical springs, and then calculating errors of said adjustable helical springs under a load in order to modify said magnitude of deformation and said load previously set for each said adjustable helical spring; and m. Returning for step (c) and said modified magnitude of deformation and load in the next cycle of said molding process.

2. The method for adjusting a stroke of a top die in a molding process as claimed in claim 1, wherein said central processing unit functions in the following steps:

a. Storing said basic parameters for each said adjustable helical spring in said central processing unit;

b. Obtaining an output force of the oil-pressure cylinder in said molding process and setting a magnitude of deformation for each said adjustable helical spring;

c. Calculating the load of each said adjustable helical spring according to a relative position of each said adjustable helical spring on said apparatus;

d. Calculating a modulus of elasticity of each said adjustable helical spring based on its load and its magnitude of deformation;

e. Using said basic parameters for each said adjustable helical spring to calculate through the interpolation an angle by which each said adjustable helical spring should be rotated;

f. When a molded product is obtained, measuring errors of said molded product at positions corresponding to said adjustable helical springs and an actual magnitude of deformation of each said adjustable helical spring; and g. Modifying said magnitude of deformation and said load previously set for each said adjustable helical spring and returning to step (d).

3. The method for adjusting a stroke of a top die in a molding process as claimed in claim 2, wherein said central processing unit stores said basic parameters for each said adjustable helical spring before said apparatus is actuated for operation, and said basic parameters including an angle by which said rotation sleeve of each said adjustable helical spring should be rotated by said rotation sleeve driver corresponding to said rotation sleeve, a load for each said adjustable helical spring, and a magnitude of deformation of each said adjustable helical spring.

4. The method for adjusting a stroke of a top die in a molding process as claimed in claim 2, wherein said central processing unit obtains said basic parameters to form a parameter table of three-dimensional matrix, whereby when said rotation sleeve of each said adjustable helical spring is driven to rotate an angle, the modulus of elasticity of said adjustable helical spring is changed, and when several fixed applied forces are used to cause corresponding deformation of one said helical spring, said applied forces and said deformation constitute a parameter table of two-dimensional matrix for the modulus of elasticity, or, when a fixed applied force and several rotating angles of said rotation sleeves are used to cause corresponding deformation of several said helical springs, said rotating angles and said deformation constitute a parameter table of two-dimensional matrix for said applied force; and wherein said applied force is obtained from a tension/pressure machine, and said magnitude of deformation is obtained from said displacement sensors associated with said adjustable helical springs.

5. The method for adjusting a stroke of a top die in a molding process as claimed in claim 1, wherein said the initial force is set by adjusting said supporting rods, said adjustable support rod seats, and said adjustable spring seats, and wherein said apparatus for adjusting die stroke is adjusted to the said initial force set in the step (b) before said molding process in step (d) is started, so as to ensure that an effective adjustment of errors in an entire stroke of said top die could be made in a final stage of molding.

6. The method for adjusting a stroke of a top die in a molding process as claimed in claim 1, wherein the number of said apparatus prepared in step (a) is one and said apparatus is directly connected to and between said top die and said oil-pressure cylinder, and said adjustable helical springs of said apparatus are at positions and in a number determined based on shapes and dimensions of said top die.

7. The method for adjusting a stroke of a top die in a molding process as claimed in claim 1, wherein the number of said apparatus prepared in step (a) is more than one and all of said apparatus are connected to a lever mechanism that is directly connected to and between said top die and said oil-pressure cylinder to amplify a magnitude of deformation of said adjustable helical springs and increase an accuracy of said apparatus, and said adjustable helical springs of said apparatus are at positions and in a number determined according to actual needs.

8. A method for adjusting a stroke of a movable die in a variable-volume mold-filling process, comprising the following steps:

a. Preparing at least an apparatus for adjusting die stroke, each of said apparatus including an upper stroke limiting plate, a lower stroke limiting plate, a plurality of supporting rods adjustably mounted between said upper and said lower stroke limiting plates, a plurality of adjustable helical springs mounted between said upper and said lower stroke limiting plates, and a central processing unit; each of said adjustable helical springs including a male case, a female case, a rotation sleeve rotatably mounted between said male and said female cases, a helical spring axially extended between said male and said female cases, a displacement sensor for measuring changes in length of said helical spring under a load and for sending a signal to said central processing unit, and a rotation sleeve driver for driving said rotation sleeve to rotate an angle based on an adjusting signal from said central processing unit and thereby adjusting a modulus of elasticity of said helical spring;

b. Using said central processing unit to store basic parameters for individual adjustable helical springs and setting (i) the initial force for said apparatus, (ii) an initial injection pressure and a subsequent injection pressure, (iii) a magnitude of deformation for each said adjustable helical spring, and (iv) a load for each said adjustable helical spring based on said subsequent injection pressure, the number of said adjustable helical springs, and relative positions of said adjustable helical springs on said movable die;

c. Calculating a modulus of elasticity of each said adjustable helical spring based on load and magnitude of deformation, and employing said basic parameters to obtain through the interpolation an angle by which said rotation sleeve corresponding to said adjustable helical spring should be rotated, and using said rotation sleeve driver to rotate said rotation sleeve according to said obtained angle;

d. Moving a plate of top die, said upper stroke limiting plate, said adjustable helical springs, said lower stroke limiting plate, and a top die toward the bottom die to perform mode-locked closing, opening vents on said dies, and then injecting a predetermined amount of molten material into a die cavity between said closed molding dies, allowing said initial injection pressure to cause said molten material to fill up a fixed-volume portion of said die cavity;

e. Closing said vents and actuating said subsequent injection pressure to fill up a variable-volume portion of said die cavity, and allowing said movable die to stop at a point at where said load of said apparatus and a pressure of said variable-volume die cavity reach a balance point;

f. Subjecting said molding material in said die cavity to a conservative pressure of said apparatus until a completely hardened molded product is obtained, so that said molded product evenly shrinks in the hardening process to provide an enhanced surface quality;

g. Sending signals of displacement of all said adjustable helical springs from said displacement sensors to said central processing unit;

h. Opening said dies and releasing said molded product from said molding dies to complete one time of variable-volume mold-filling process;

i. Using said central processing unit to convert said displacement signals received from said displacement sensors and to obtain errors of said released product at positions corresponding to said adjustable helical springs, and then calculating errors of loads of said adjustable helical springs to modify said magnitude of deformation and said load previously set for each said adjustable helical spring; and j. Returning to step (c) and using said modified magnitude of deformation and load in the next cycle of said variable-volume mold-filling process.

9. The method for adjusting a stroke of a movable die in a variable-volume mold-filling process as claimed in claim 8, wherein said central processing unit functions in the following steps:

a. Storing said basic parameters for each said adjustable helical spring in said central processing unit;

b. Obtaining an output force of said subsequent injection pressure in said variable-volume mold-filling process and setting a magnitude of deformation for each said adjustable helical spring;

c. Calculating the load of each said adjustable helical spring according to a relative position of each said adjustable helical spring on said apparatus;

d. Calculating a modulus of elasticity of each said adjustable helical spring based on its load and its magnitude of deformation;

e. Using said basic parameters for each said adjustable helical spring to calculate through the interpolation an angle by which each said adjustable helical spring should be rotated;

f. When a molded product is obtained, measuring errors of said molded product at positions corresponding to said adjustable helical springs and an actual magnitude of deformation of each said adjustable helical spring; and g. Modifying said magnitude of deformation and said load previously set for each said adjustable helical spring and returning to step (d).

10. The method for adjusting a stroke of a movable die in a variable-volume mold-filling process as claimed in claim 9, wherein said central processing unit stores said basic parameters for each said adjustable helical spring before said apparatus is actuated for operation, and said basic parameters including an angle by which said rotation sleeve of each said adjustable helical spring should be rotated by said rotation sleeve driver corresponding to said rotation sleeve, a load of each said adjustable helical spring, and a magnitude of deformation of each said adjustable helical spring.

11. The method for adjusting a stroke of a movable die in a variable-volume mold-filling process as claimed in claim 9, wherein said central processing unit obtains said basic parameters to form a parameter table of three-dimensional matrix, whereby when said rotation sleeve of each said adjustable helical spring is driven to rotate an angle, the modulus of elasticity of said adjustable helical spring is changed, and when several fixed applied forces are used to cause corresponding deformation of a helical spring, said applied forces and said deformation constitute a parameter table of two-dimensional matrix for the modulus of elasticity, or, when a fixed applied force and several rotating angles of said rotation sleeves are used to cause corresponding deformation of several said helical springs, said rotating angles and said deformation constitute a parameter table of two-dimensional matrix for the applied force; and wherein said applied force is obtained from a tension/pressure machine, and said magnitude of deformation is obtained from said displacement sensors associated with said adjustable helical springs.

12. The method for adjusting a stroke of a movable die in a variable-volume mold-filling process as claimed in claim 8, wherein said the initial force is set by adjusting said supporting rods, said adjustable support rod seats, and said adjustable spring seats, and wherein said apparatus for adjusting die stroke is adjusted to said initial force set in the step (b) before said variable-volume mold-filling process in step (d) is started, so as to ensure that said apparatus could overcome a total pressure at a first stage of mold-filling when said apparatus starts operating, and keep said movable die from undesired displacement.

13. The method for adjusting a stroke of a movable die in a variable-volume mold-filling process as claimed in claim 8, wherein the number of said apparatus prepared in step (a) is one and said apparatus is directly connected to and between said plate of top die and said movable die, and said adjustable helical springs of said apparatus are at positions and in a number determined based on shapes and dimensions of said top die.

14. The method for adjusting a stroke of a movable die in a variable-volume mold-filling process as claimed in claim 8, wherein the number of said apparatus prepared in step (a) is more than one and all of said apparatus are connected to a lever mechanism that is directly connected to and between said plate of top die and said movable die to amplify a magnitude of deformation of said adjustable helical springs and increase an accuracy of said apparatus, and said adjustable helical springs of said apparatus are at positions and in a number determined according to actual needs.

15. An apparatus for adjusting die stroke, comprising:
an upper stroke limiting plate having a plurality of adjustable spring seats and a plurality of adjustable supporting rod seats mounted to a bottom surface thereof;
a lower stroke limiting plate having a plurality of fixed spring seats and a plurality of fixed supporting rod seats mounted to a top surface thereof corresponding to said adjustable spring seats and said adjustable supporting rod seats, respectively, on said upper stroke limiting plate;
a plurality of supporting rods, each of which being mounted between one of said adjustable supporting rod seats and one of said fixed supporting rod seats aligned to each other; said supporting rods being used to adjust an initial distance between said upper and said lower stroke limiting plates and to support the initial force of said apparatus;
a plurality of adjustable helical springs, each of which being mounted between one of said adjustable spring seats and one of said fixed spring seats aligned to each other; each said adjustable helical spring including a male case, a female case, a rotation sleeve rotatably mounted between said male and said female cases, and a helical spring axially extended between said male and said female cases to engage with said rotation sleeve; each said adjustable helical spring also having a displacement sensor connected thereto for measuring a change of length of said helical spring under a load and for sending out a signal representing said measured change in length, and a rotation sleeve driver connected to said rotation sleeve for rotating said rotation sleeve and thereby adjusting said adjustable helical spring to a required modulus of elasticity; and
a central processing unit functioning to receive signals of actual magnitudes of deformation of said adjustable helical springs output by said displacement sensors, to obtain errors on a molded product, and to compare basic parameters set for said apparatus with said actual magnitudes of deformation of said adjustable helical springs and said errors of said molded product in order to output adjusting signals to said rotation sleeve drivers for the same to rotate said rotation sleeves and thereby adjust said adjustable helical springs to the required modulus of elasticity; and
central processing unit, said displacement sensors, and said rotation sleeve drivers together providing a cyclic adjusting mode for said apparatus, enabling production of a best molded product within a lowest possible number of process cycles through a convergence method; and said central processing unit, when being set to automatically read errors of molded products, enabling adjustment of any accumulative error occurred in a molding process from time to time, resulted in a minimized rate of bad yield of molded products.

16. The apparatus for adjusting die stroke as claimed in claim 15, wherein said adjustable helical springs are at positions and in a number determined based on shapes and dimensions of said top die.

17. The apparatus for adjusting die stroke as claimed in claim 15, wherein said rotation sleeve and said male case of each said adjustable helical spring have screw pitches the same as that of said helical spring under the said initial force, and said rotation sleeve driver is actuated to function only when said apparatus for adjusting die stroke is not under any load.

18. The apparatus for adjusting die stroke as claimed in claim 15, wherein said molding dies are adapted to connect to a lever mechanism, which is in turn connected to a plurality of said apparatus to amplify a magnitude of deformation and to increase an accuracy of said apparatus.

19. The apparatus for adjusting die stroke as claimed in claim 18, wherein each of said apparatus is set to the initial force, and wherein said lever mechanism deformed under a pressure causes said apparatus to deform due to a tension, and said lever mechanism having a magnitude of deformation smaller than that of said apparatus, so that said apparatus reflect more accurate load and magnitude of deformation of said lever mechanism.

* * * * *